United States Patent
Shibui et al.

(10) Patent No.: US 8,001,781 B2
(45) Date of Patent: Aug. 23, 2011

(54) MOTOR-DRIVEN SUPERCHARGER (75) Inventors: Yasuyuki Shibui, Tokyo (JP); Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 244 days.

(21) Appl. No.: 12/300,746

(22) PCT Filed: Apr. 25, 2007

(86) PCT No.: PCT/JP2007/058947
§ 371 (c)(1),
(2), (4) Date: Nov. 13, 2008

(87) PCT Pub. No.: WO2007/141969
PCT Pub. Date: Dec. 13, 2007

(65) Prior Publication Data
US 2010/0218499 A1 Sep. 2, 2010

(30) Foreign Application Priority Data

Jun. 2, 2006 (JP) .................... 2006-154517

(51) Int. Cl.
*F02B 33/44* (2006.01)
*F02B 39/00* (2006.01)
*F02B 37/10* (2006.01)
*F04B 9/14* (2006.01)
*F04B 17/02* (2006.01)
*H02K 7/14* (2006.01)
*H02K 3/44* (2006.01)

(52) U.S. Cl. .......... 60/608; 60/607; 60/605.3; 417/374; 417/407

(58) Field of Classification Search ............ 60/597–612, 60/605.3; 417/407, 374; 290/52; 310/54–55; 184/6.11; H02K 3/44, 9/19, 7/14; F02B 39/00, 37/10
See application file for complete search history.

(56) References Cited

U.S. PATENT DOCUMENTS

| 3,675,056 A | 7/1972 | Lenz |
| 3,742,123 A | 6/1973 | Haub, Jr. |
| 3,778,194 A | 12/1973 | Miller et al. |
| 3,927,530 A | 12/1975 | Braun |

(Continued)

FOREIGN PATENT DOCUMENTS

CA 2068369 11/1992

(Continued)

OTHER PUBLICATIONS

First Office Action, issued in corresponding Chinese Patent Application No. 200780020456.2, issued Nov. 20, 2009.

(Continued)

*Primary Examiner* — Thai Ba Trieu
(74) *Attorney, Agent, or Firm* — Griffin & Szipl, P.C.

(57) ABSTRACT

A motor-driven supercharger is provided with a thrust bearing (30) rotatably supporting a thrust force applied to a turbine shaft (12). The thrust bearing (30) is constituted by a small-diameter disc-shaped thrust collar (32) rotating together with a turbine shaft, and a turbine side thrust bearing (34) and a compressor side thrust bearing (36) which block a movement in an axial direction of the thrust collar. The compressor side thrust bearing (36) has a small-diameter ring portion (37) including a thrust surface which is in contact with the thrust collar and has approximately an equal diameter, and a flange portion (38a) fixed to a housing (16) in the turbine side, and the small-diameter ring portion and the flange portion are arranged at different positions in an axial direction.

6 Claims, 5 Drawing Sheets

U.S. PATENT DOCUMENTS

| | | | |
|---|---|---|---|
| 3,961,867 A | 6/1976 | Woollenweber | |
| 4,198,063 A | 4/1980 | Shimizu et al. | |
| 4,253,031 A | 2/1981 | Frister | |
| 4,301,375 A | 11/1981 | Anderson | |
| 4,641,977 A | 2/1987 | Woollenweber | |
| 4,704,075 A | 11/1987 | Johnston et al. | |
| 4,745,755 A | 5/1988 | Kawamura | |
| 4,757,686 A | 7/1988 | Kawamura et al. | |
| 4,833,887 A | 5/1989 | Kawamura et al. | |
| 5,121,605 A | 6/1992 | Oda et al. | |
| 5,323,613 A | 6/1994 | Akiyama | |
| 5,587,332 A | 12/1996 | Chang et al. | |
| 5,605,045 A | 2/1997 | Halimi et al. | |
| 5,798,587 A | 8/1998 | Lee | |
| 5,834,117 A | 11/1998 | Onishi | |
| 5,857,332 A * | 1/1999 | Johnston et al. | 60/607 |
| 5,870,894 A | 2/1999 | Woollenweber et al. | |
| 5,904,471 A | 5/1999 | Woollenweber et al. | |
| 5,906,098 A | 5/1999 | Woollenweber et al. | |
| 6,032,466 A * | 3/2000 | Woollenweber et al. | 60/607 |
| 6,102,672 A | 8/2000 | Woollenweber et al. | |
| 6,129,524 A | 10/2000 | Woollenweber et al. | |
| 6,145,314 A | 11/2000 | Woollenweber et al. | |
| 6,160,332 A | 12/2000 | Tsuruhara | |
| 6,218,747 B1 | 4/2001 | Tsuruhara | |
| 6,257,834 B1 | 7/2001 | Bremer et al. | |
| 6,278,199 B1 | 8/2001 | Grant et al. | |
| 6,293,769 B1 | 9/2001 | Radermacher et al. | |
| 6,416,281 B1 | 7/2002 | Bremer et al. | |
| 6,449,950 B1 * | 9/2002 | Allen et al. | 60/607 |
| 6,609,375 B2 | 8/2003 | Allen et al. | |
| 6,647,724 B1 | 11/2003 | Arnold et al. | |
| 6,668,553 B1 | 12/2003 | Ghizawi | |
| 6,768,332 B2 | 7/2004 | Tong et al. | |
| 6,845,617 B1 * | 1/2005 | Allen et al. | 60/607 |
| 6,871,499 B1 | 3/2005 | Allen et al. | |
| 6,986,648 B2 | 1/2006 | Williams et al. | |
| 7,008,194 B2 | 3/2006 | Frankenstein | |
| 7,010,916 B2 | 3/2006 | Sumser et al. | |
| 7,056,103 B2 | 6/2006 | LaRue | |
| 7,352,077 B2 | 4/2008 | Shibui et al. | |
| 7,360,361 B2 | 4/2008 | Prusinski et al. | |
| 7,458,214 B2 * | 12/2008 | Philippe | 60/608 |
| 2003/0051475 A1 | 3/2003 | Allen et al. | |
| 2003/0118461 A1 | 6/2003 | Hodapp et al. | |
| 2005/0082941 A1 | 4/2005 | Iida et al. | |
| 2006/0081226 A1 | 4/2006 | Bolz | |
| 2006/0123783 A1 * | 6/2006 | Philippe | 60/607 |
| 2006/0225419 A1 | 10/2006 | Prusinski et al. | |
| 2006/0245913 A1 | 11/2006 | Thiele et al. | |
| 2007/0036664 A1 | 2/2007 | Shibui et al. | |
| 2008/0087018 A1 * | 4/2008 | Woollenweber | 60/605.3 |
| 2009/0025386 A1 * | 1/2009 | Rumsby | 60/607 |
| 2010/0175377 A1 * | 7/2010 | Hippen et al. | 60/602 |
| 2010/0266430 A1 * | 10/2010 | Shimizu | 417/423.8 |

FOREIGN PATENT DOCUMENTS

| | | |
|---|---|---|
| CH | 266731 | 2/1950 |
| CN | 2605696 Y | 3/2004 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 | 10/2003 |
| FR | 2859499 | 3/2005 |
| GB | 2021874 | 12/1979 |
| GB | 2162377 | 1/1986 |
| JP | 58-124024 | 7/1983 |
| JP | 59-134167 U | 9/1984 |
| JP | 60-153826 | 10/1985 |
| JP | 61-49126 | 4/1986 |
| JP | 61-237830 A | 10/1986 |
| JP | 01-019122 | 1/1989 |
| JP | 01-171006 | 7/1989 |
| JP | 02-099722 | 4/1990 |
| JP | 03-138430 | 6/1991 |
| JP | 4-119624 | 10/1992 |
| JP | H05-026202 | 4/1993 |
| JP | 05199708 | 8/1993 |
| JP | 06-042361 | 2/1994 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110577 | 4/2000 |
| JP | 2000-130176 | 5/2000 |
| JP | 2000-145468 | 5/2000 |
| JP | 2000145468 A | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003232340 A | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005207337 A | 8/2005 |
| JP | 2005-248799 | 9/2005 |
| JP | 2005248799 A | 9/2005 |
| JP | 2006-002568 | 1/2006 |
| JP | 2006-514526 | 4/2006 |
| JP | 2007-309101 | 11/2007 |
| JP | 2007297973 A * | 11/2007 |
| JP | 2007321698 A * | 12/2007 |
| JP | 2007321699 A * | 12/2007 |
| JP | 2008-029166 | 2/2008 |
| JP | 2008031949 A * | 2/2008 |
| JP | 2009143365 A * | 7/2009 |
| JP | 2009243361 A * | 10/2009 |
| JP | 2010121589 A * | 6/2010 |
| KR | 10 2004 0089337 A | 10/2004 |
| KR | 10 2004 0105849 A | 12/2004 |
| WO | 84/04136 | 10/1984 |
| WO | 97/11263 A1 | 3/1997 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | 2005/113961 A1 | 12/2005 |

OTHER PUBLICATIONS

Microfilm of the specification and drawings annexed to the request of Japanese Utility Model Application No. 10710/1983 (Laid-open No. 116537/1984), Toyota Motor Corp, Aug. 6, 1984.

Microfilm of the specification and drawings annexed to the request of Japanese Utility Model Application No. 142414/1985 ( Laid-open No. 49629/1987), Nissan Motor Corp, Mar. 27, 1987.

Microfilm of the specification and drawings annexed to the request of Japanese Utility Model Application No. 115203/1986 (Laid-open No. 22301/1988), Nissan Motor Corp, Feb. 15, 1988.

Office Action issued in related Korean Patent Application No. 10-2007-0005555 (included herein in Korean and Japanese) dated Mar. 30, 2009.

Office Action issued in co-pending U.S. Appl. No. 11/617,211 mailed Feb. 22, 2010.

Chinese Office Action issued in co-pending U.S. Appl. No. 12/377,987 Chinese Patent Application No. 200780030544.0. mailed Mar. 8, 2010.

International Search Report issued in related application No. PCT/JP2007/058946, completed May 10, 2007 and mailed May 22, 2007.

International Search Report issued in corresponding application No. PCT/JP2007/058947, completed May 31, 2007 and mailed Jun. 12, 2007.

Microfilm of the specification and drawings annexed to the request of Japanese Utility Model Application No. 134167/1984 (Laid-open No. 49126/1986), dated Apr. 2, 1986.

Office Action issued in co-pending U.S. Appl. No. 12/300,726, dated Dec. 21, 2010.

Office Action issued in Japanese Patent Application No. 2006-207973, of co-pending U.S. Appl. No. 12/864,837, dated Jan. 11, 2011 with an english translation.

http://answers.yahoo.com/question/index?qid=20100220052035A, dated Feb. 20, 2010, downloaded Mar. 9, 2011, 1 page.

http://www.answers.com/topic/friction-fit, downloaded Mar. 9, 2011, 1 page.

http://www.roymech.co.uk/Useful_Tables/ISO_Tolerances/ISO, downloaded Mar. 9, 2011, 2 pgs.

http://encyclopedia2.thefreedictionary.com/friction+fit, downloaded Mar. 9, 2011, 2 pgs.

International Search Report issued in corresponding International Application No. PCT/JP2007/058947, completed May 31, 2007, mailed Jun. 12, 2007, labelled as Exhibit A, in its Japanese language.

International Search Report issued in corresponding International Application No. PCT/JP2007/058947, completed May 31, 2007, mailed Jun. 12, 2007, labelled as Exhibit B, in its English translation.

U.S. Office Action issued in co-pending U.S. Appl. No. 12/300,726, dated May 2, 2011.

Office Action issued in corresponding Korean Patent Application No. Oct. 2008-7028778, dated Feb. 28, 2011 with its english translation.

* cited by examiner

MOTOR-DRIVEN SUPERCHARGER

This is a National Phase Application in the United States of International Patent Application No. PCT/JP2007/058947 filed Apr. 25, 2007, which claims priority on Japanese Patent Application No. 154517/2006, filed Jun. 2, 2006. The entire disclosures of the above patent applications are hereby incorporated by reference.

BACKGROUND OF THE INVENTION

1. Field of the Invention

The present invention relates to a motor-driven supercharger having an electric motor built-in.

2. Description of Related Art

To supply an air having a boosted density by a compressor to an engine is called as supercharging, and an apparatus providing for a driving work of the compressor on the basis of an exhaust energy is called as an exhaust gas turbine supercharger (an exhaust-gas turbocharger).

Figure 1:
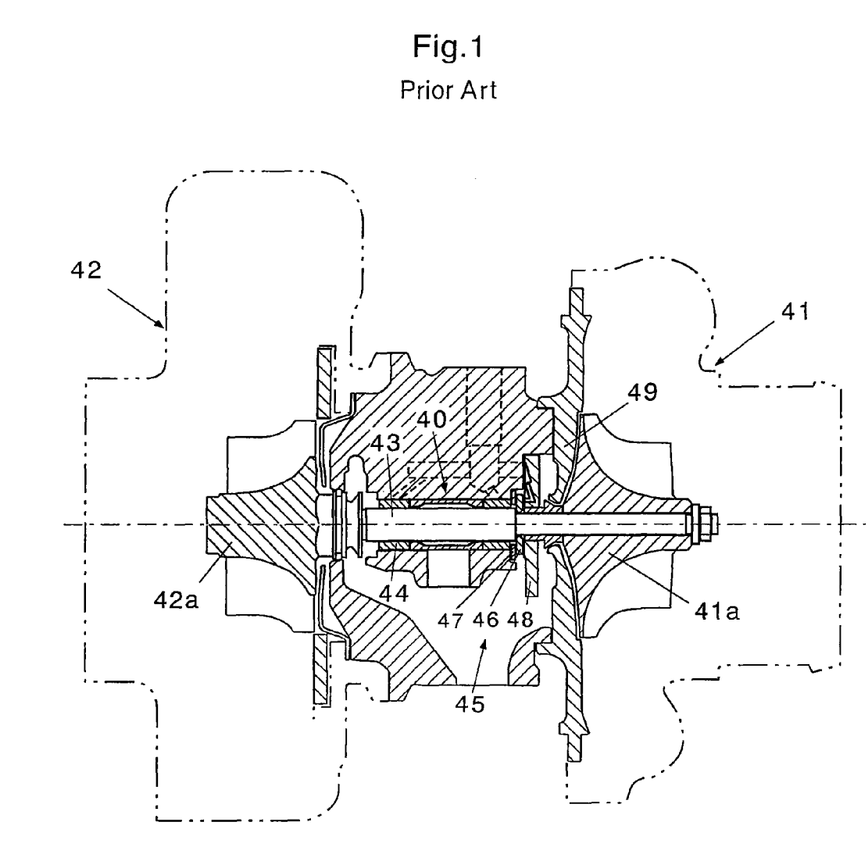
FIG. 1 is a view showing an example of a conventional exhaust gas turbine supercharger.

FIG. 1 is a view showing one example of a conventional exhaust gas turbine supercharger. As shown in this drawing, the conventional exhaust gas turbine supercharger is generally constituted by a compressor 41 and a turbine 42 which are arranged so as to provide a bearing unit 40 therebetween, and the compressor 41 and the turbine 42 respectively have a compressor impeller 41a and a turbine impeller 42a built-in. The compressor impeller 41a and the turbine impeller 42a are coupled to each other by a connecting shaft (a shaft 43) supported by a bearing unit 40, and are structured such that the turbine impeller 42a is rotationally driven by an exhaust gas of the engine, a rotating force is transmitted to the compressor impeller 41a via the shaft 43, and the air is compressed by the compressor impeller 41a so as to be supercharged to the engine.

Further, in this drawing, the bearing unit 40 has a radial bearing 44 supporting a radial force of the shaft 43 and a thrust bearing 45 supporting a thrust force. The radial bearing 44 is constituted by a full-floating bearing in this example, however, there is a case that it is constituted by a semi-floating bearing.

The thrust bearing 45 is constituted by a disc-shaped thrust collar 46 rotating together with the shaft 43, and a turbine side thrust bearing 47 and a compressor side thrust bearing 48 which block a movement in an axial direction of the thrust collar 46.

On the other hand, in the exhaust gas turbine supercharger mentioned above, there has been already proposed a structure having an electric motor built-in for assisting an acceleration at a time of rotating at a low speed (for example, patent document 1). Hereinafter, the exhaust gas turbine supercharger having the electric motor mentioned above built-in is simply called as "motor-driven supercharger".

Figure 2:
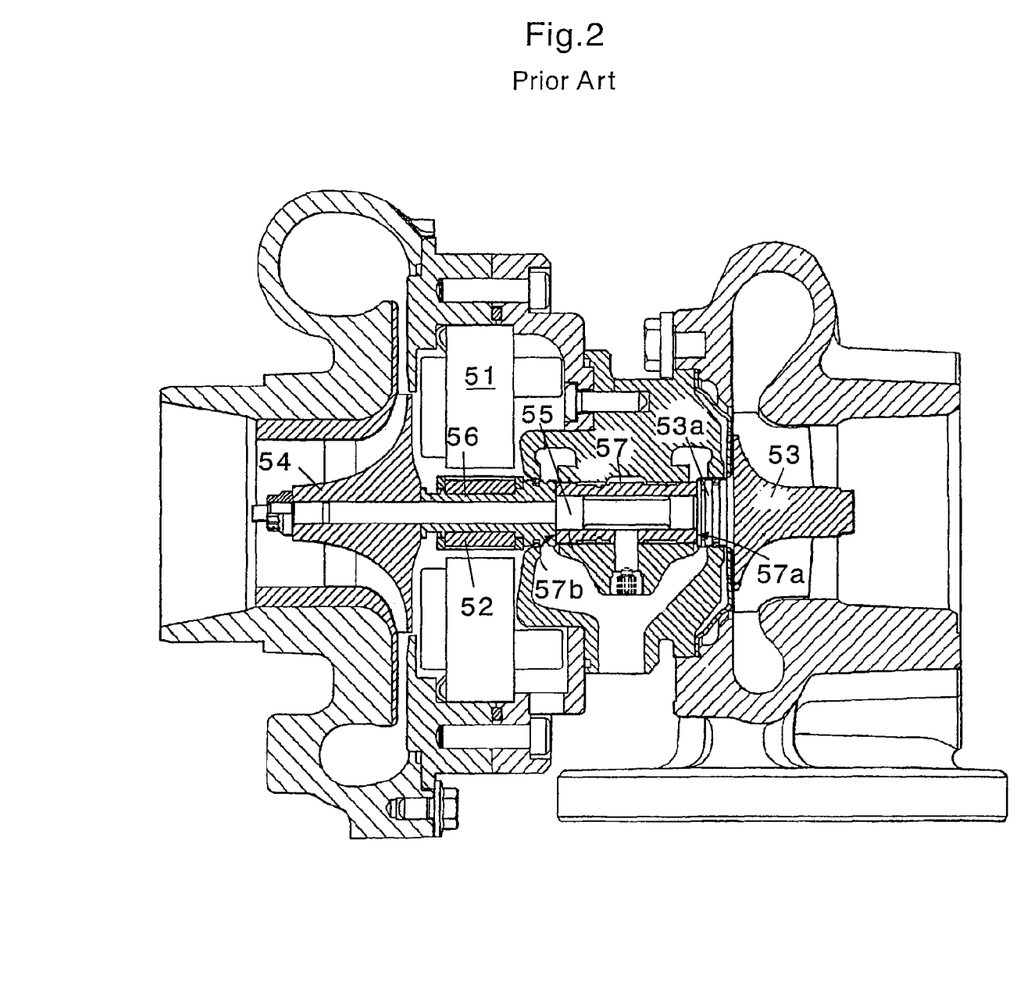
FIG. 2 is a schematic view of a turbo charger of patent document 1.

The turbocharger in the patent document 1 is provided with an electric motor (a stator 51 and a rotor 52) rotationally driving a rotor, as shown in FIG. 2. The rotor is constituted by a turbine impeller 53, a compressor impeller 54, and a spacer collar 56 to which a shaft 55 connecting the impellers and the rotor 52 of the electric motor are attached. The shaft 55 is supported by a single semi-floating bearing 57. The semi-floating bearing 57 has thrust surfaces 57a and 57b engaging with a hub 53a of the turbine 53 and the spacer collar 56.

In accordance with this structure, the thrust force applied to the rotor is supported by the thrust surfaces 57a and 57b engaging with the hub 53a of the turbine and the spacer collar 56 in the semi-floating bearing 57.

Patent Document 1: U.S. Pat. No. 6,449,950 "ROTOR AND BEARING SYSTEM FOR ELECTRICALLY ASSISTED TURBOCHARGER"

In the exhaust gas turbine supercharger, since a pressure applied to the turbine impeller is generally higher than a pressure applied to the compressor impeller, a great thrust force is generated in a direction toward the compressor impeller.

Accordingly, it is necessary to supply a sufficient amount of lubricating oil to the thrust bearing supporting a rotating shaft of the exhaust gas turbine supercharger.

However, in the case that the thrust bearing is provided in an outer side of the radial bearing, and the electric motor is provided between the thrust bearing and the compressor impeller, there is a problem that an overhang amount of the shaft is enlarged at a length of the thrust bearing and the electric motor.

For example, in the prior art in FIG. 1, if the stator and the rotor of the electric motor are provided between the compressor impeller 41a and the seal plate 49, it is necessary to elongate the overhang amount of the shaft at least at an amount corresponding to the stator of the electric motor, and there is a risk that a rotation stability is lowered at a time of rotating at a high speed.

Further, in the prior art in FIG. 2 having the stator and the rotor of the electric motor built-in, since a distance between the thrust surfaces 57a and 57b in both ends of the semi-floating bearing 57 is long, there is a problem that a gap (a play) tends to be generated in a thrust direction due to a heat expansion or the like. Further, in this example, it is hard to supply and discharge a sufficient amount of lubricating oil to the thrust surface 57a suffered to the great thrust force in the direction toward the compressor impeller.

SUMMARY OF THE INVENTION

The present invention is made for solving the problems mentioned above. In other words, an object of the present invention is to provide a motor-driven supercharger which can shorten an overhang amount of a shaft, can supply a sufficient amount of lubricating oil to a thrust surface suffered to a great thrust force in a compressor direction, and can smoothly discharge the lubricating oil from the thrust surface, even in the case that a thrust bearing is provided in an outer side of a radial bearing, and an electric motor is provided between the thrust bearing and a compressor impeller.

In accordance with the present invention, there is provided a motor-driven supercharger comprising:

a compressor impeller;

a motor stator fixed within a housing; and a motor rotor rotationally driven by the motor stator, wherein the motor-driven supercharger is provided with a thrust bearing rotatably supporting a thrust force applied to a turbine shaft, wherein the thrust bearing is constituted by a small-diameter disc-shaped thrust collar rotating together with a turbine shaft, and a turbine side thrust bearing and a compressor side thrust bearing which block a movement in an axial direction of the thrust collar, and wherein the compressor side thrust bearing has a small-diameter ring portion including a thrust surface which is in contact with the thrust collar and has approximately an equal diameter, and a flange portion fixed to the housing in a side closer to the turbine than the thrust collar, and the small-diameter ring portion and the flange portion are arranged at different positions in an axial direction.

In accordance with a preferable aspect of the present invention, a turbine side coil end of the motor stator is formed as a taper surface in which an inner surface is expanded to the turbine side, and a seal plate comparting between the compressor side thrust bearing and the motor stator is formed in a truncated conical shape positioned in an inner side of the taper surface.

Further, the small-diameter ring portion and the truncated conical portion are formed by an integral structure of separate structures.

Further, concave grooves facing to each other and extending toward an oil discharge port are provided in an inner surface of the truncated conical portion of the compressor side thrust bearing and an outer surface of the housing facing thereto, and an oil discharge path toward the oil discharge port is formed on the basis of a combination thereof.

In accordance with the structure of the present invention mentioned above, since the thrust bearing is constituted by the small-diameter disc-shaped thrust collar rotating together with the turbine shaft, and the turbine side thrust bearing and the compressor side thrust bearing which block the movement in the axial direction of the thrust collar, it is possible to hold the thrust collar by the turbine side thrust bearing and the compressor side thrust bearing so as to rotatably support the thrust forces in both directions applied to the turbine shaft.

Further, since the compressor side thrust bearing is constituted by the small-diameter ring portion and the truncated conical portion, and the turbine side end portion of the truncated conical portion is fixed to the housing in the side closer to the turbine than the thrust collar, it is possible to elongate the radial bearing to the closer side to the compressor than the fixed position of the compressor side thrust bearing, and it is possible to shorten the overhang amount of the shaft at that degree.

Further, since the turbine side coil end of the motor stator is formed as the taper surface in which the inner surface is expanded to the turbine side, and the seal plate comparting between the compressor side thrust bearing and the motor stator is formed in the truncated conical shape positioned in the inner side of the taper surface, it is possible to overlap the compressor side thrust bearing, the seal plate and the turbine side inner surface of the motor state which are respectively formed in the truncated conical shape, in a radial direction at the same position in the axial direction.

Therefore, in accordance with this structure, even in the case that the electric motor is provided between the thrust bearing and the compressor impeller, it is possible to shorten the overhang amount of the shaft.

Further, it is possible to reduce a number of the parts by integrally structuring the small-diameter ring portion and the truncated conical portion. Further, it is possible to reduce a manufacturing cost by inversely integrating in accordance with a fitting or the like on the basis of the separate structure.

Further, in the case that the concave grooves facing to each other and extending toward the oil discharge port are provided in the inner surface of the truncated conical portion of the compressor side thrust bearing and the outer surface of the housing facing thereto, and the oil discharge path toward the oil discharge port is formed on the basis of the combination thereof, it is possible to control the direction of the discharged oil and it is possible to improve an oil discharge property.

DESCRIPTION OF PREFERRED EMBODIMENTS

A description will be given below of preferable embodiments in accordance with the present invention with reference to the accompanying drawings. In this case, in each of the drawings, the same reference numerals are attached to the common portions in each of the drawings, and an overlapping description will be omitted.

Figure 3:
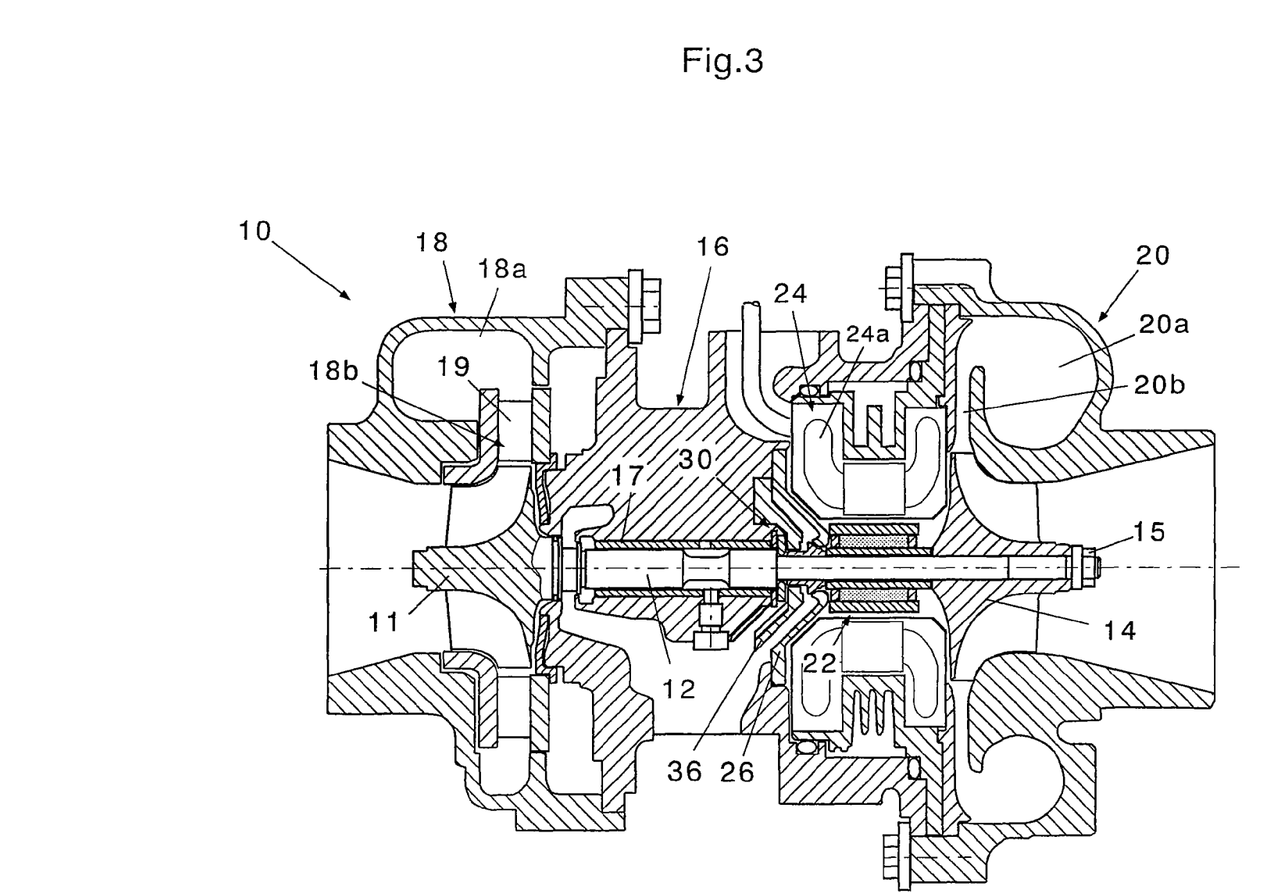
FIG. 3 is a schematic view of a whole of a motor-driven supercharger in accordance with the present invention.

FIG. 3 is a schematic view of a whole of a motor-driven supercharger in accordance with the present invention. In this drawing, a motor-driven supercharger 10 in accordance with the present invention is provided with a turbine shaft 12, a compressor impeller 14, and a housing. The housing is constituted by a bearing housing 16, a turbine housing 18 and a compressor housing 20, in this embodiment.

The turbine shaft 12 has a turbine impeller 11 in one end (a left end in the drawing). In this embodiment, the turbine impeller 11 is integrally formed in the turbine shaft 12, however, the present invention is not limited to this, but may be structured such that the turbine impeller 11 is separately attached.

The compressor impeller 14 is coupled to the other end (a right end in the drawing) of the turbine shaft 12 in such a manner as to be integrally rotated by a shaft end nut 15.

The bearing housing 16 rotatably supports the turbine shaft 12 by a radial bearing 17. Further, the turbine shaft 12 is supported by a thrust bearing 30 in such a manner as to be prevented from moving in an axial direction.

The turbine housing 18 rotatably surrounds the turbine impeller 11, and is coupled to the bearing housing 16. The turbine housing 18 has a scroll chamber 18a in which an exhaust gas is introduced to an inner portion from an outer portion, and an annularly formed flow path 18b guiding the exhaust gas from the scroll chamber 18a to the turbine impeller 11.

Further, a plurality of nozzle vanes 19 are arranged in the flow path 18b at a fixed distance in a peripheral direction. The nozzle vane is preferably constituted by a variable nozzle vane, and is structured such that a flow path area formed therebetween can be changed, however, the present invention is not limited to this, but may be constituted by a fixed nozzle vane.

The compressor housing 20 rotatably surrounds the compressor impeller 14, and is coupled to the bearing housing 16. The compressor housing 20 has a scroll chamber 20a in which a compressed air is introduced to an inner portion, and an annularly formed flow path 20b guiding the compressed air from the compressor impeller 14 to the scroll chamber 20a.

In accordance with the structure mentioned above, it is possible to rotationally drive the turbine impeller 11 by the exhaust gas of the engine, transmit the rotating force to the compressor impeller 14 via the turbine shaft 12 and compress the air by the compressor impeller 14 so as to supercharge to the engine.

Further, in FIG. 3, the motor-driven supercharger 10 in accordance with the present invention is further provided with a motor rotor 22 and a motor stator 24.

The motor rotor 22 corresponds to a rotor of an electric motor, and the motor stator 24 corresponds to a stator of the electric motor. A brushless a.c. motor is structured by the motor rotor 22 and the motor stator 24.

In the present invention, a turbine side coil end 24a of the motor stator 24 is formed in a taper surface in which an inner surface is expanded to the turbine side. The taper surface is preferably formed by deforming the coil end 24a, that is, a coil winding by a press molding or the like within a range in which a function is not deteriorated.

Further, the motor rotor 22 has a shorter shaft length than the motor stator 24, and is preferably fixed so as to close to the compressor impeller 14 of the turbine shaft 12.

It is preferable that the a.c. motor can correspond to a high-speed rotation (for example, at least 100 to 200 thousands rpm) of the turbine shaft 12, and can execute a rotational drive at a time of accelerating and a regenerating operation at a time of decelerating. Further, it is preferable that a drive voltage of the a.c. motor is equal to or higher (for example, 24 to 36 V) than a d.c. voltage (for example, 12 V) of a battery mounted on a vehicle. It is possible to downsize the a.c. motor by increasing the drive voltage.

Figure 4:
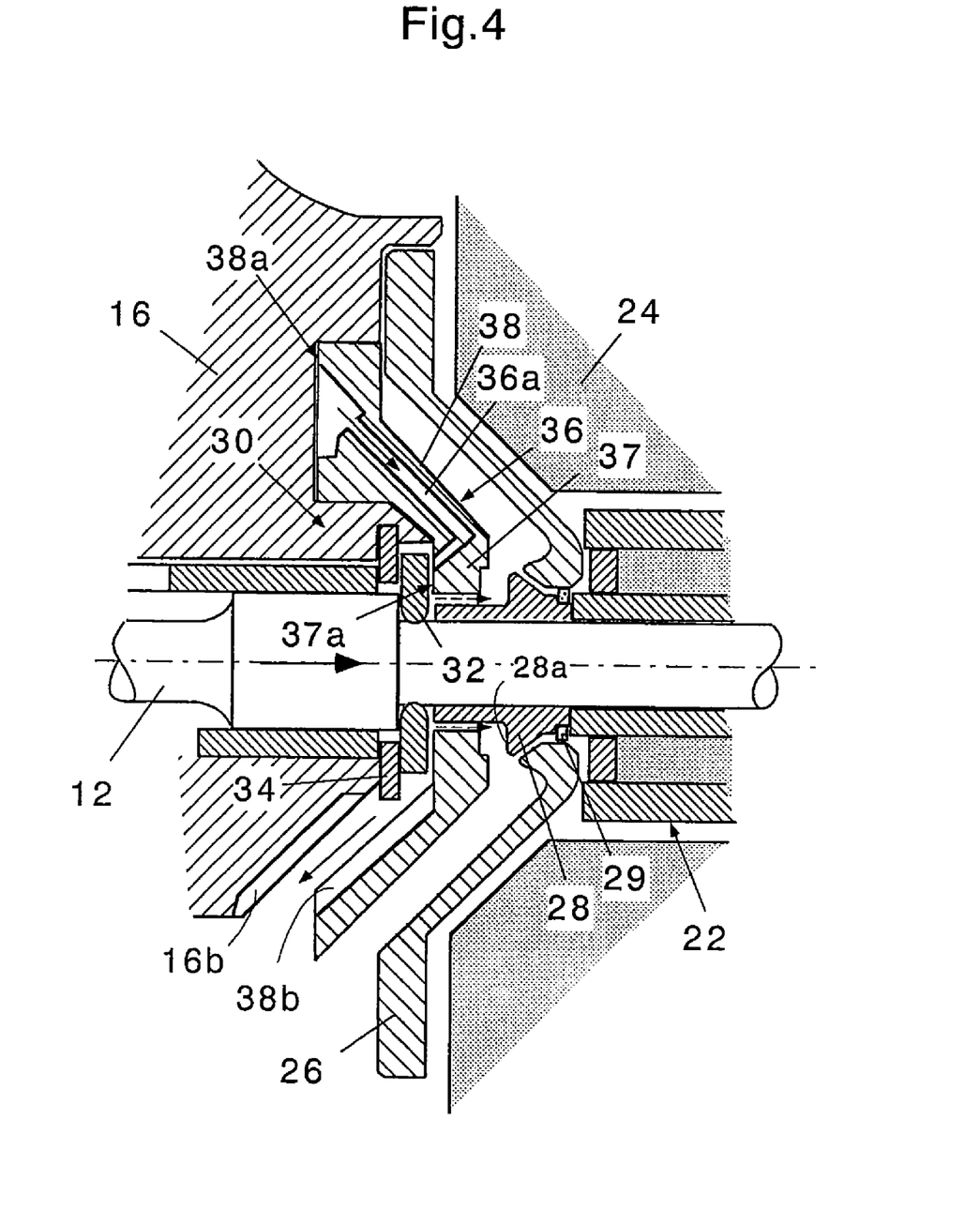
FIG. 4 is a partly enlarged view of FIG. 3.

FIG. 4 is a partly enlarged view of FIG. 3.

As shown in this drawing, the thrust bearing 30 in accordance with the present invention is constituted by a small-diameter disc-shaped thrust collar 32 rotating together with the turbine shaft 12, and a turbine side thrust bearing 34 and a compressor side thrust bearing 36 which block a movement in an axial direction of the thrust collar 32.

The compressor side thrust bearing 36 is formed in a truncated conical shape which is constituted by a small-diameter ring portion 37 and a truncated conical portion 38 and is bulged to the compressor side in the center. In this example, the small-diameter ring portion 37 and the truncated conical portion 38 are formed as an integral structure for reducing a number of the parts.

The small-diameter ring portion 37 has a thrust surface 37a which is in contact with the thrust collar 32 and has an approximately equal diameter. The truncated conical portion 38 has a conical outer surface gradually increasing to the turbine side from an outer peripheral surface of the small-diameter ring portion 37, and a turbine side end portion 38a (that is, a flange portion) thereof is fixed to the housing in a side closer to the turbine than the thrust collar 32.

In other words, the compressor side thrust bearing 36 has the small-diameter ring portion 37 including the thrust surface which is in contact with the thrust collar 32 and has an approximately equal diameter, and a flange portion 38a fixed to the housing in a side closer to the turbine than the thrust collar 32, and the small-diameter ring portion 37 and the flange portion 38a are arranged at different positions in an axial direction.

Accordingly, the flange portion is positioned in the side closer to the turbine than the small-diameter ring portion 37.

The compressor side thrust bearing 36 has an oil supply flow path 36a.

The oil supply flow path 36a has a function of supplying a lubricating oil to a surface (a left surface in the drawing) brought into contact with the thrust collar 32 from an inner side of the bearing housing 16.

Further, concave grooves 38b and 16b facing to each other and extending toward an oil discharge port are provided below the turbine shaft 12, on an inner surface of the truncated conical portion 38 of the compressor side thrust bearing 36 and an outer surface of the bearing housing 16 facing thereto, and an oil discharge path toward the oil discharge port is formed on the basis of a combination thereof.

Figure 5:
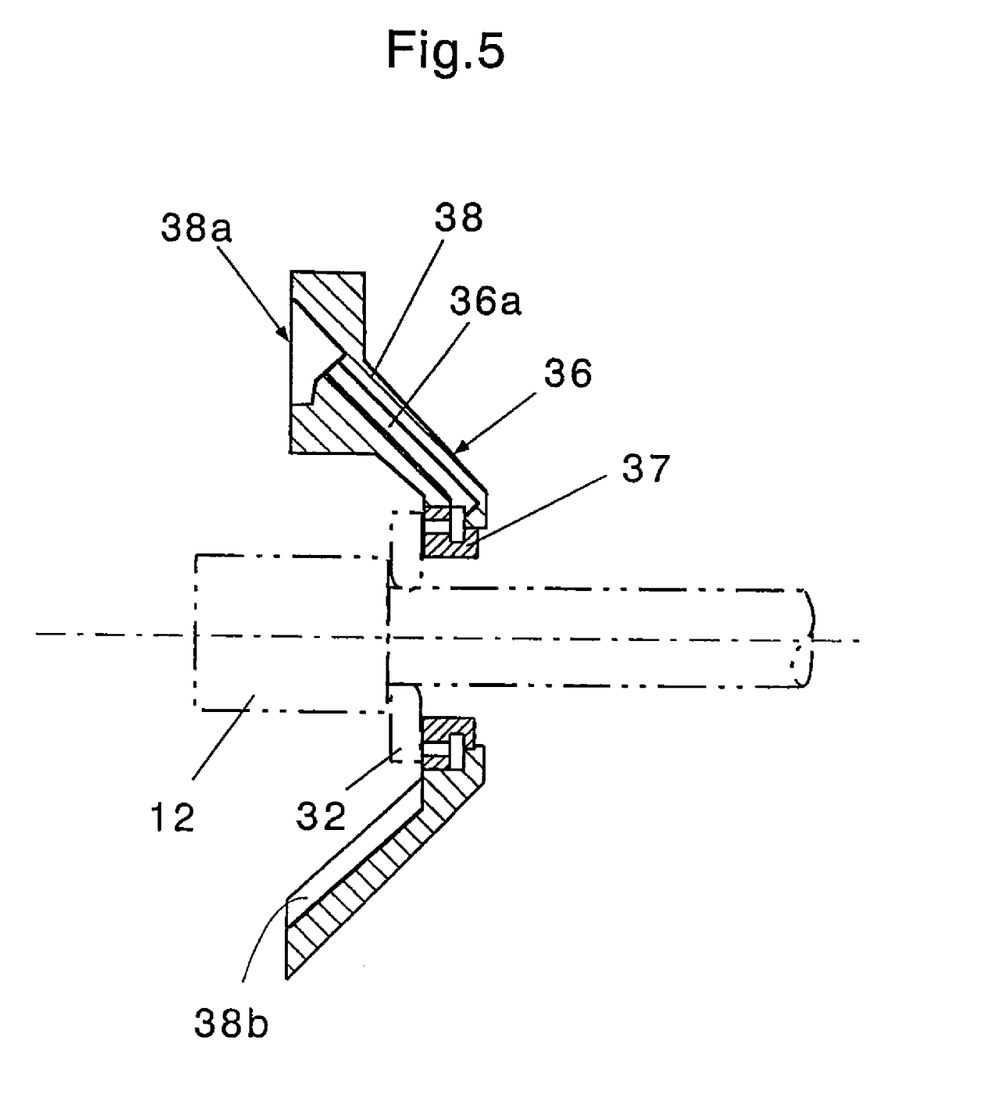
FIG. 5 is a view of the other structure of a compressor side thrust bearing.

FIG. 5 is a view of the other structure of the compressor side thrust bearing.

In this drawing, the compressor side thrust bearing 36 is formed in the truncated conical shape which is constituted by the small-diameter ring portion 37 and the truncated conical portion 38 and is bulged to the compressor side in the center. Further, in this example, the small-diameter ring portion 37 and the truncated conical portion 38 are formed as separate structures integrated in accordance with a fitting or the like for reducing a manufacturing cost. In this example, the turbine side end portion 38a (that is, the flange portion) is fixed to the housing in the side closer to the turbine than the thrust collar 32, and the flange portion 38a is positioned in a side closer to the turbine side than the small-diameter ring portion 37.

The other structures are the same as FIG. 4.

In accordance with the structure of the present invention mentioned above, since the thrust bearing is constituted by the small-diameter disc-shaped thrust collar 32 rotating together with the turbine shaft 12, and the turbine side thrust bearing 34 and the compressor side thrust bearing 36 which block the movement in the axial direction of the thrust collar, it is possible to hold the thrust collar 34 by the turbine side thrust bearing 34 and the compressor side thrust bearing 36 so as to rotatably support the thrust forces in both directions applied to the turbine shaft 12.

Further, since the compressor side thrust bearing 36 is constituted by the small-diameter ring portion 37 and the truncated conical portion 38, and the turbine side end portion 38a of the truncated conical portion 38 is fixed to the bearing housing 16 in the side closer to the turbine than the thrust collar 32, it is possible to elongate the radial bearing to the side closer to the compressor than the fixed position of the compressor side thrust bearing 36, and it is possible to shorten the overhang amount of the shaft at that degree.

Further, it is possible to control the direction of the discharged oil and it is possible to improve an oil discharge property, by setting the concave grooves 38b and 16b facing to each other and extending toward the oil discharge port in the inner surface of the truncated conical portion 38 of the compressor side thrust bearing 36 and the outer surface of the bearing housing 16 facing thereto, and forming the oil discharge path toward the oil discharge port on the basis of the combination thereof.

In FIGS. 3 and 4, the motor rotor 22 is provided between the compressor side thrust bearing 36 and the compressor impeller 14.

Further, the motor-driven supercharger in accordance with the present invention further has a seal plate 26, an oil thrower member 28 and a seal member 29.

The seal plate 26 corresponds to a partition wall which is fixed to the bearing housing 16 and comparts between the compressor side thrust bearing 36 and the motor rotor 22, in this embodiment. In the present invention, the seal plate 26 is positioned in an inner side of a turbine side taper surface of the motor stator 24 mentioned above, and is formed in a truncated conical shape.

In accordance with this structure, it is possible to overlap the compressor side thrust bearing 36, the seal plate 26 and the turbine side inner surface of the motor stator 24 which are respectively formed in the truncated conical shape, in a radial direction at an equal position in the axial direction.

Therefore, in accordance with this structure, even in the case that the electric motor is provided between the thrust bearing and the compressor impeller, it is possible to shorten the overhang amount of the shaft.

Further, the oil thrower member 28 is positioned between the seal plate 26 and the compressor side thrust bearing 36, is fixed to the turbine shaft 12 and is rotated together with the turbine shaft 12. The oil thrower member 28 has a vertical surface 28a which is larger than a hollow through hole of the compressor side thrust bearing 36, and is approximately orthogonal to the turbine shaft 12.

The seal member 29 seals in a liquid tight manner between the oil thrower member 28 and the seal plate 26.

In this case, it goes without saying that the present invention is not limited to the embodiments mentioned above, but can be variously modified within the scope of the present invention.

What is claimed is:

1. A motor-driven supercharger comprising:
   (A) a turbine shaft having a turbine impeller in one end;
   (B) a compressor impeller rotationally driven by the turbine shaft;
   (C) a motor stator fixed within a housing;
   (D) a motor rotor rotationally driven by the motor stator; and
   (E) a thrust bearing rotatably supporting a thrust force applied to the turbine shaft,
   wherein the thrust bearing comprises
      i. a small-diameter disc-shaped thrust collar rotating together with the turbine shaft; and
      ii. a turbine side thrust bearing and a compressor side thrust bearing that block movement of the thrust collar in an axial direction, wherein the compressor side thrust bearing is disposed on a side closer to the compressor impeller than the thrust collar in the axial direction, and
   wherein the compressor side thrust bearing comprises
      a. a small-diameter ring portion including a thrust surface that is in contact with the thrust collar on a turbine side and the thrust surface has approximately an equal diameter to that of the thrust collar;
      b. a truncated conical portion that has a conical outer surface that gradually increases to the turbine side from an outer peripheral surface of the small-diameter ring portion;
      c. a flange portion that is positioned at a turbine side end portion of the truncated conical portion and that is fixed to the housing closer to the turbine than the thrust collar; and
      d. an oil supply flow path that opens on the thrust surface and supplies a lubricating oil to the thrust surface, and the small-diameter ring portion and the flange portion are located at different positions in the axial direction.

2. A motor-driven supercharger as claimed in claim 1, wherein a turbine side coil end of the motor stator is formed as a tapered surface of which an inner surface is expanded to the turbine side, and a seal plate is disposed between the compressor side thrust bearing and the motor stator so as compart two spaces, wherein the seal plate is formed in a truncated conical shape that is positioned on an inner side of the tapered surface.

3. A motor-driven supercharger as claimed in claim 2, wherein concave grooves facing each other and extending toward an oil discharge port are provided in an inner surface of the truncated conical portion of the compressor side thrust bearing and in an outer surface of the housing, wherein the concave grooves include a first concave groove formed in the inner surface of the truncated conical portion of the compressor side thrust bearing and a second concave groove formed in the outer surface of the housing so as to face the first concave groove, wherein the first concave groove and the second concave groove form an oil discharge path directed toward the oil discharge port.

4. A motor-driven supercharger as claimed in claim 2, further comprising:
   (F) an oil thrower member positioned between the seal plate and the compressor side thrust bearing, wherein the oil thrower member is fixed to the turbine shaft so as to rotate together with the turbine shaft.

5. A motor-driven supercharger as claimed in claim 1, wherein the thrust collar is disposed within the truncated conical portion of the compressor side thrust bearing.

6. A motor-driven supercharger as claimed in claim 5, wherein the thrust collar is disposed on the turbine shaft and adjacent the small-diameter ring portion of the compressor side thrust bearing on the turbine side of the compressor side thrust bearing.

\* \* \* \* \*